United States Patent
Krishnamurthy et al.

(10) Patent No.: US 11,777,800 B2
(45) Date of Patent: Oct. 3, 2023

(54) IDENTIFYING OUT-OF-BAND CONFIGURATION CHANGES TO VALIDATE INTENT FILES

(71) Applicant: Juniper Networks, Inc., Sunnyvale, CA (US)

(72) Inventors: Pradeep H. Krishnamurthy, Bangalore (IN); Fnu Nadeem, Fremont, CA (US); Raviraj Satish Deshmukh, Pune (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/449,601

(22) Filed: Sep. 30, 2021

(65) Prior Publication Data
US 2023/0006881 A1 Jan. 5, 2023

(30) Foreign Application Priority Data
Jun. 24, 2021 (IN) .............................. 202141028381

(51) Int. Cl.
*H04L 41/0816* (2022.01)
*H04L 41/22* (2022.01)

(52) U.S. Cl.
CPC .......... *H04L 41/0816* (2013.01); *H04L 41/22* (2013.01)

(58) Field of Classification Search
CPC ........................... H04L 41/0186; H04L 41/22
See application file for complete search history.

(56) References Cited

U.S. PATENT DOCUMENTS

| | | | |
|---|---|---|---|
| 10,382,265 B1* | 8/2019 | Anburose | H04L 61/5076 |
| 11,032,213 B1* | 6/2021 | Hussain | H04L 41/40 |
| 11,451,451 B2* | 9/2022 | Ratkovic | H04L 43/0817 |
| 2014/0156816 A1* | 6/2014 | Lopez Da Silva | H04L 41/042 709/221 |

(Continued)

FOREIGN PATENT DOCUMENTS

| | | |
|---|---|---|
| EP | 3522452 A1 | 8/2019 |
| EP | 3771150 A1 | 1/2021 |

OTHER PUBLICATIONS

Scheid, Eder J., et al. "INSpIRE: Integrated NFV-based intent refinement environment." 2017 IFIP/IEEE Symposium on Integrated Network and Service Management (IM). IEEE. (Year: 2017).*

(Continued)

*Primary Examiner* — John M Macilwinen
(74) *Attorney, Agent, or Firm* — Shumaker & Sieffert, P.A.

(57) ABSTRACT

A controller device manages a plurality of network devices. The controller device includes a memory comprising a configuration database including a set of stored network device configurations, wherein each stored network device configuration of the set of stored network device configurations corresponds to a network device of the set of network devices. Additionally, the controller device includes processing circuitry configured to receive an intent file corresponding to an intended configuration for the set of network devices; receive a message from a network device of the set of network devices indicating an out-of-band configuration change at the network device; and determine, based on a stored network device configuration corresponding to the network device and an actual configuration of the network device, whether the intent file is compatible with the out-of-band configuration change.

20 Claims, 4 Drawing Sheets

(56) References Cited

U.S. PATENT DOCUMENTS

2019/0238410 A1* 8/2019 Kang .................. H04L 41/0895
2020/0195501 A1* 6/2020 Shenoy ............... H04L 41/0816
2020/0351167 A1* 11/2020 Sharma ............... H04L 63/1408
2020/0374192 A1* 11/2020 Leijon ................. H04L 41/0869
2021/0028980 A1* 1/2021 R ........................ H04L 41/0843
2022/0166679 A1* 5/2022 Hafeez ................. H04L 41/145

OTHER PUBLICATIONS

Kodeswaran, Sethuram Balaji, et al. "Utilizing semantic tags for policy based networking." IEEE Globecom 2007—IEEE Global Telecommunications Conference. IEEE. (Year: 2007).*

Ya et al. English translation of CN 112104473 A. (Year: 2020).*

Wei, Yiming, Mugen Peng, and Yaqiong Liu. "Intent-based networks for 6G: Insights and challenges." Digital Communications and Networks 6.3: 270-280. (Year: 2020).*

Bjorklund et al., "Network Management Datastore Architecture (NMDA)", Internet Engineering Task Force (IETF) ; rfc8342, Mar. 2018, 44 pp.

Extended Search Report from counterpart European Application No. 22177871.5 dated Nov. 17, 2022, 10 pp.

Response to Extended Search Report dated Nov. 17, 2022, from counterpart European Application No. 22177871.5 filed Jun. 28, 2023, 34 pp.

* cited by examiner

IDENTIFYING OUT-OF-BAND CONFIGURATION CHANGES TO VALIDATE INTENT FILES

This application claims priority to Indian Provisional Patent Application No. 202141028381, filed on Jun. 24, 2021, the entire contents of which is incorporated herein by reference.

TECHNICAL FIELD

The disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controller devices, may support these services such that an administrator can easily create and manage these high-level network configuration services.

In particular, user configuration of devices may be referred to as "intents." An intent-based networking system lets administrators describe the intended network/compute/storage state. User intents can be categorized as business policies or stateless intents. Business policies, or stateful intents, may be resolved based on the current state of a network. Stateless intents may be fully declarative ways of describing an intended network/compute/storage state, without concern for a current network state.

Intents may be represented as intent data models, which may be modeled using unified graphs. Intent data models may be represented as connected graphs, so that business policies can be implemented across intent data models. For example, data models may be represented using connected graphs having vertices connected with has-edges and reference (ref) edges. Controller devices may model intent data models as unified graphs, so that the intend models can be represented as connected. In this manner, business policies can be implemented across intent data models. When Intents are modeled using a unified graph model, extending new intent support needs to extend the graph model and compilation logic.

In order to configure devices to perform the intents, a user (such as an administrator) may write translation programs that translate high-level configuration instructions (e.g., instructions according to an intent data model, which may be expressed as a unified graph model) to low-level configuration instructions (e.g., instructions according to a device configuration model). As part of configuration service support, the user/administrator may provide the intent data model and a mapping between the intent data model to a device configuration model.

In order to simplify the mapping definition for the user, controller devices may be designed to provide the capability to define the mappings in a simple way. For example, some controller devices provide the use of Velocity Templates and/or Extensible Stylesheet Language Transformations (XSLT). Such translators contain the translation or mapping logic from the intent data model to the low-level device configuration model. Typically, a relatively small number of changes in the intent data model impact a relatively large number of properties across device configurations. Different translators may be used when services are created, updated, and deleted from the intent data model.

SUMMARY

In general, this disclosure describes techniques for managing network devices. A network management system (NMS) device, also referred herein as a controller or controller device, may be configured to implement an intended configuration indicated by a high-level intent file. The controller may receive the high-level intent file from an administrator for a plurality of managed network devices. The intended configuration may represent a configuration for the plurality of network devices managed by the administrator, and the controller may process the high-level intent file in order to achieve the intended configuration. For example, the controller may translate the high-level intent to a plurality of low-level configurations, each low-level configuration of the plurality of low-level configurations corresponding to a network device of the plurality of network devices. The controller may push the low-level configurations to the plurality of managed network devices in order to achieve the intended configuration in the high-level intent file. Since controller generates the low-level configurations based on the intended configuration, the controller may store backups of the low-level configurations pushed to the network devices in order to preserve a record of the intended configuration. In some cases, the controller may also store a backup of the high-level intent file.

In some cases, one or more of the managed network devices may implement a configuration change that was not dictated by a low-level configuration pushed by the controller. These configuration changes may be referred to as "out-of-band" configuration changes, because the controller does not cause the configuration changes. Out-of-band configuration changes sometimes are incompatible with the intended configuration indicated by the high-level intent file. For example, an out-of-band configuration change at a network device may interfere with an ability of the administrator to manage the network device. Consequently, it may be beneficial for the controller to determine whether out-ofband configuration change is compatible with the intended configuration indicated by the high-level intent file. In some cases, the controller may output an instruction to change the configuration of the network device based on determining that the out-of-band configuration change is not compatible with the intended configuration The techniques of the disclosure may provide specific improvements to the computer-related field of computer networking that have practical applications. For example, the controller may generate one or more flagged XML Path Language (XPath) operations based on the high-level high level intent. These flagged XPath operations may represent XPath operations to "watch for" in out-of-band configurations. When the controller determines that an out-of-band configuration change is associated with one or more of the flagged XPath operations, then the controller may determine that the out-of-band configuration change is incompatible with the intended configuration. By generating the flagged XPath operations, the controller may increase an ability to detect out-of-band configuration changes that are incompatible with an intended configuration as compared with systems that do not generate flagged XPath operations.

In some examples, a controller device manages a set of network devices, the controller device comprising a memory comprising a configuration database including a set of stored network device configurations, wherein each stored network device configuration of the set of stored network device configurations corresponds to a network device of the set of network devices. Additionally, the controller device comprises processing circuitry configured to: receive an intent file corresponding to an intended configuration for the set of network devices; receive a message from a network device of the set of network devices indicating an out-of-band configuration change at the network device; and determine, based on a stored network device configuration corresponding to the network device and an actual configuration of the network device, whether the intent file is compatible with the out-of-band configuration change.

In some examples, a method includes receiving, by processing circuitry of a controller device, an intent file corresponding to an intended configuration for the set of network devices; receiving, by the processing circuitry, a message from a network device of the set of network devices indicating an out-of-band configuration change at the network device; and determining, by the processing circuitry based on a stored network device configuration corresponding to the network device and an actual configuration of the network device, whether the intent file is compatible with the out-of-band configuration change, wherein a memory of the controller device comprises a configuration database including a set of stored network device configurations, wherein each stored network device configuration of the set of stored network device configurations corresponds to a network device of the set of network devices.

In some examples, a system includes a set of network devices; and a controller device that manages the set of network devices, the controller device comprising: a memory comprising a configuration database including a set of stored network device configurations, wherein each stored network device configuration of the set of stored network device configurations corresponds to a network device of the set of network devices; and processing circuitry configured to: receive an intent file corresponding to an intended configuration for the set of network devices; receive a message from a network device of the set of network devices indicating an out-of-band configuration change at the network device; and determine, based on a stored network device configuration corresponding to the network device and an actual configuration of the network device, whether the intent file is compatible with the out-of-band configuration change.

The details of one or more examples are set forth in the accompanying drawings and the description below. Other features, objects, and advantages will be apparent from the description and drawings, and from the claims.

DETAILED DESCRIPTION

Figure 1:
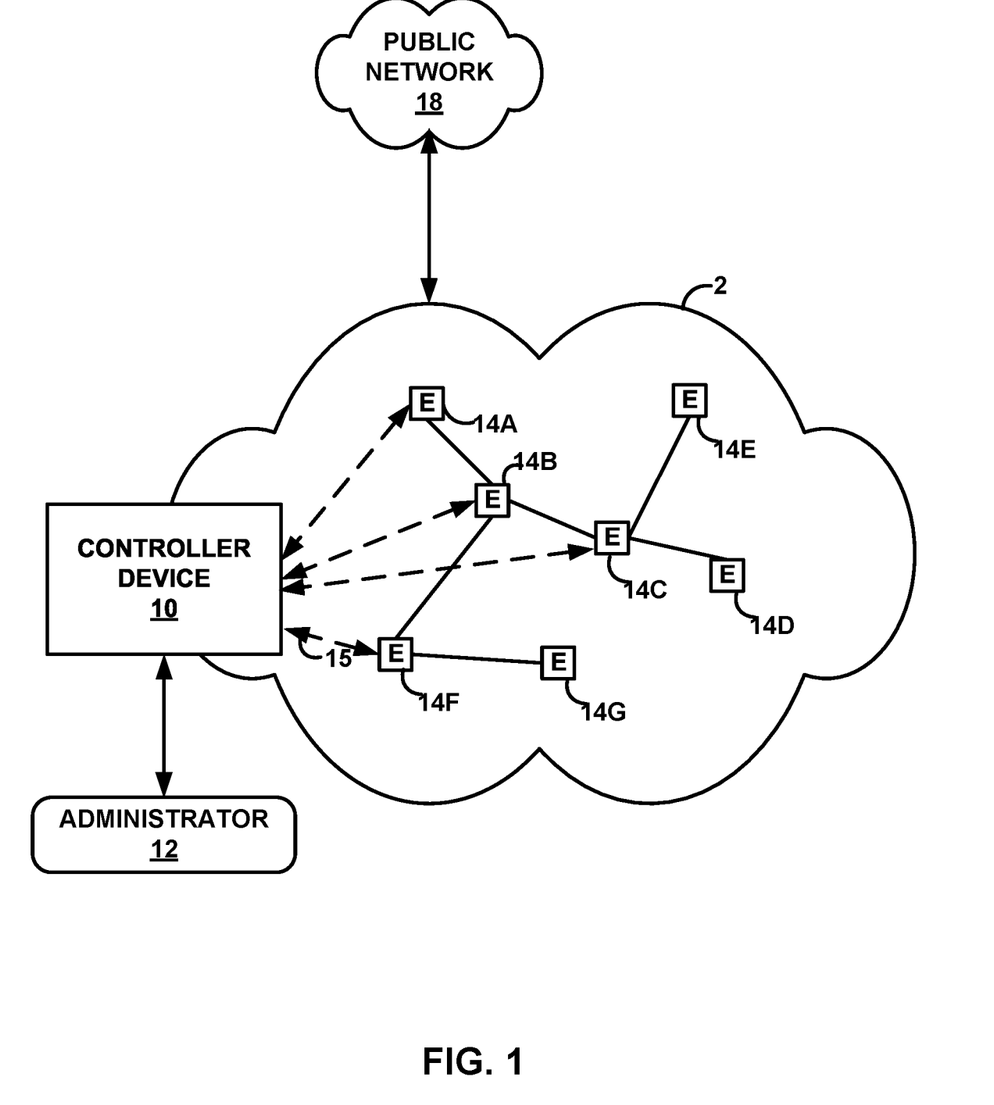
FIG. 1 is a block diagram illustrating an example including elements of an enterprise network that is managed using a controller device, in accordance with one or more techniques of this disclosure.

FIG. 1 is a block diagram illustrating an example including elements of an enterprise network 2 that are managed using a controller device 10, in accordance with one or more techniques of this disclosure. Managed elements 14A-14G (collectively, "elements 14") of enterprise network 2 include network devices interconnected via communication links to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Controller device 10 is communicatively coupled to elements 14 via enterprise network 2. Controller device 10, in some examples, forms part of a device management system, although only one device of the device management system is illustrated for purpose of example in FIG. 1. Controller device 10 may be coupled either directly or indirectly to the various elements 14. Once elements 14 are deployed and activated, administrator 12 uses controller device 10 to manage the network devices using a device management protocol. One example device protocol is the Simple Network Management Protocol (SNMP) that allows controller device 10 to traverse and modify management information bases (MIBs) that store configuration data within each of managed elements 14.

In common practice, controller device 10, also referred to as a network management system (NMS) or NMS device, and elements 14 are centrally maintained by an IT group of the enterprise. Administrator 12 interacts with controller device 10 to remotely monitor and configure elements 14. For example, administrator 12 may receive alerts from controller device 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrator 12 uses controller device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 14, e.g., element 14F, using controller device 10, to directly configure element 14F. In this manner, a user can provide commands in a format for execution directly to elements 14.

Further, administrator 12 can also create scripts that can be submitted by controller device 10 to any or all of elements 14. For example, in addition to a CLI interface, elements 14 also provide interfaces for receiving scripts that specify the commands in accordance with a scripting language. In a sense, the scripts may be output by controller device 10 to automatically invoke corresponding remote procedure calls (RPCs) on the managed elements 14. The scripts may conform to, e.g., extensible markup language (XML) or another data description language.

Administrator 12 uses controller device 10 to configure elements 14 to specify certain operational characteristics that further the objectives of administrator 12. For example, administrator 12 may specify for an element 14 a particular operational policy regarding security, device accessibility, traffic engineering, quality of service (QoS), network address translation (NAT), packet filtering, packet forwarding, rate limiting, or other policies. Controller device 10 uses one or more network management protocols designed for management of configuration data within managed network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741. Controller device 10 may establish NETCONF sessions with one or more of elements 14.

Controller device 10 may be configured to accept high-level configuration data, or intents, from administrator 12 (which may be expressed as structured input parameters, e.g., according to the Yet Another Next Generation (YANG) language, which is described in Bjorklund, "YANG—A Data Modeling Language for the Network Configuration Protocol (NETCONF)," Internet Engineering Task Force, RFC 6020, October 2010, available at tools.ietf.org/html/rfc6020). Controller device 10 may also be configured to output respective sets of low-level device configuration data, e.g., device configuration additions, modifications, and removals.

In some examples, controller device 10 may use YANG modeling for an intent data model and low-level device configuration models. This data may contain relations across YANG entities, such as list items and containers. In some examples, controller device 10 may convert a YANG data model into a database model, and convert YANG validations into data validations.

Controller device 10 may receive data from administrator 12 representing any or all of create, update, and/or delete actions with respect to the intent data model. Controller device 10 may be configured to use the same compilation logic for each of create, update, and delete as applied to the graph model.

In general, controllers like controller device 10 use a hierarchical data model for intents, low-level data models, and resources. The hierarchical data model can be based on YANG or YAML. The hierarchical data model can be represented as a graph, as discussed above. Modern systems have supported intents to ease the management of networks. Intents are declarative. To realize intents, controller device 10 attempts to select optimal resources. Customer environments may be configured to allow customers (e.g., administrators 12) to control intent realization and assure programmed intents. In some examples, controller device 10 may construct a graph data model by querying elements 14 to determine resources provided by elements 14. Controller device 10 may generally be configured with information representing types of resources provided by each of elements 14, but may query elements 14 to determine specific resource information for resources matching each of the types of resources provided by elements 14. Types of resources may include, for example, forwarding tables, routing tables, network access policies (e.g., for access by certain users, firewall policies, or the like), or other such resources.

Although controller device 10 may push low-level configurations to one or more or elements 14, elements 14 may also, in some cases, implement configuration changes without instruction from controller device 10. Configuration changes implemented without instruction from controller device 10 may be referred to as "out-of-band" configuration changes. In some examples, controller device 10 may execute applications that use telemetry data for closed loop validation of intents in order to determine whether an intent is invalidated by an out-of-band configuration change. However, in the case of some configuration resources such as firewall policies, such telemetry data may be unavailable. It may be beneficial for controller device 10 to detect an out-of-band configuration change in a configuration resource where telemetry data is unavailable.

In some examples, a memory of the controller device 10 may be configured to store one or more low-level configurations, where each low-level configuration of the one or more low-level configurations represents a low-level configuration that the controller device 10 pushes to one of elements 14. By storing low-level configurations pushed to elements 14, controller device 10 may be configured to restore a configuration of elements 14 if the configuration is altered or otherwise invalidated. Storing low-level configurations also allows controller device 10 to compare a low-level configuration with the actual configuration of elements 14 in order to determine whether any changes have been made to the configuration of elements 14. Such changes may, in some cases, represent out-of-band configuration changes made at the network device without input from controller device 10. Out-of-band configuration changes may, in some cases, invalidate the intended configuration in the high-level intent file received by the controller 10. It may be beneficial for controller device 10 to determine whether an out-of-band configuration change is compatible with the intended configuration. When controller device 10 determines that an out-of-band configuration change is incompatible with the intended configuration, controller device 10 may notify an administrator (e.g., administrator 12) that the high-level configuration is incompatible with an out-of-band configuration change. Additionally, or alternatively, controller device 10 may output one or more instructions to restore a configuration of the respective element so that the configuration of the element is compatible with the intended configuration.

In some examples, controller device 10 may receive a message from an element of elements 14 (e.g., element 14A) indicating an out-of-band configuration change at element 14A. Each time that controller device 10 outputs a low-level configuration to one of elements 14, controller device 10 outputs a message to the respective element including an identification tag indicating that the low-level configuration is pushed from the controller device 10. When the element implements the configuration change indicated by the low-level configuration, the element may send a return message to the controller 10 indicating that the configuration change is implemented. Additionally, or alternatively, the return message may indicate the identification tag. Controller 10 may receive the message and determine that the configuration change was not an out-of-band configuration change, since the message includes the identification tag.

In some cases, controller 10 may receive a message from one of elements 14 indicating a configuration change, and the message does not include an identification tag indicating that the element implemented the configuration change based on a low-level configuration pushed by controller device 10. Based on message omitting the identification tag, the controller device 10 may determine that the configuration change is an out-of-band configuration change.

When controller 10 identifies an out-of-band configuration change at one of elements 14 (e.g., at element 14A), controller device 10 may determine whether the out-of-band configuration change invalidates or is incompatible with an intended configuration indicated by a high-level intent file received by controller 10. To determine whether the out-of-band configuration change invalidates the high-level configuration, the controller device 10 may retrieve, from element 14A, information indicative of an actual configuration of element 14A. In some examples, to retrieve the information indicative of the actual configuration of element 14A, the controller device 10 may output, to element 14A, a message requesting the actual configuration of element 14A. In response to the message, controller device 10 may receive, from element 14A, information indicative of the actual configuration of element 14A. The actual configuration of element 14A may represent a configuration of element 14A when the out-of-band configuration change is implemented. Controller device 10 may retrieve, from the memory of controller device 10, a low-level configuration that controller device 10 pushed to element 14A before element 14A implemented the out-of-band configuration change. Since the low-level configuration pushed to element 14A does not include the out-of-band configuration change, it may be possible for controller device 10 to compare the low-level configuration change with the actual configuration in order to identify the out-of-band configuration change.

Controller device 10 may execute a difference operation in order to determine a difference between the actual configuration of element 14A and the low-level configuration pushed to element 14A by controller device 10. By determining the difference, controller device 10 may identify one or more XML Path Language (XPath) operations corresponding to the out-of-band configuration change. XPath is a programming language that is configured to select nodes from an Extensible Markup Language (XML) document. Consequently, the one or more identified XPath operations may indicate one or more nodes of element 14A that are involved in the out-of-band configuration change or otherwise affected by the out-of-band configuration change. Controller 10 may determine whether the out-of-band configuration change to these one or more nodes invalidates the high-level configuration.

As discussed above, controller 10 is configured to receive an intended high-level configuration in a high-level intent file and translate the high-level configuration to one or more low-level configurations for elements 14. When controller 10 translates the high-level configuration to the one or more low-level configurations, controller 10 may extract information from the high-level configuration to generate one or more XPath operations. For example, the high-level configuration may include syntax representing a user selection of one or more flagged nodes for an element (e.g., element 14A). Controller device 10 may generate, based on this syntax, one or more flagged XPaths which indicate the one or more flagged nodes. Controller device 10 may store the one or more flagged XPaths in the memory. When controller device 10 identifies one or more XPath operations associated with the out-of-band configuration change to the configuration of element 14A, controller device 10 may compare the one or more XPath operations associated with the out-of-band configuration change with the one or more flagged XPath operations corresponding to element 14A. When at least one XPath operation of the one or more XPath operations associated with the out-of-band configuration change matches at least one of the flagged XPath operations, controller device 10 may determine that the high-level configuration is incompatible with the out-of-band configuration change. When none of the one or more XPath operations associated with the out-of-band configuration change match the flagged XPath operations, controller device 10 may determine that the high-level configuration is compatible with the out-of-band configuration change.

Figure 2:
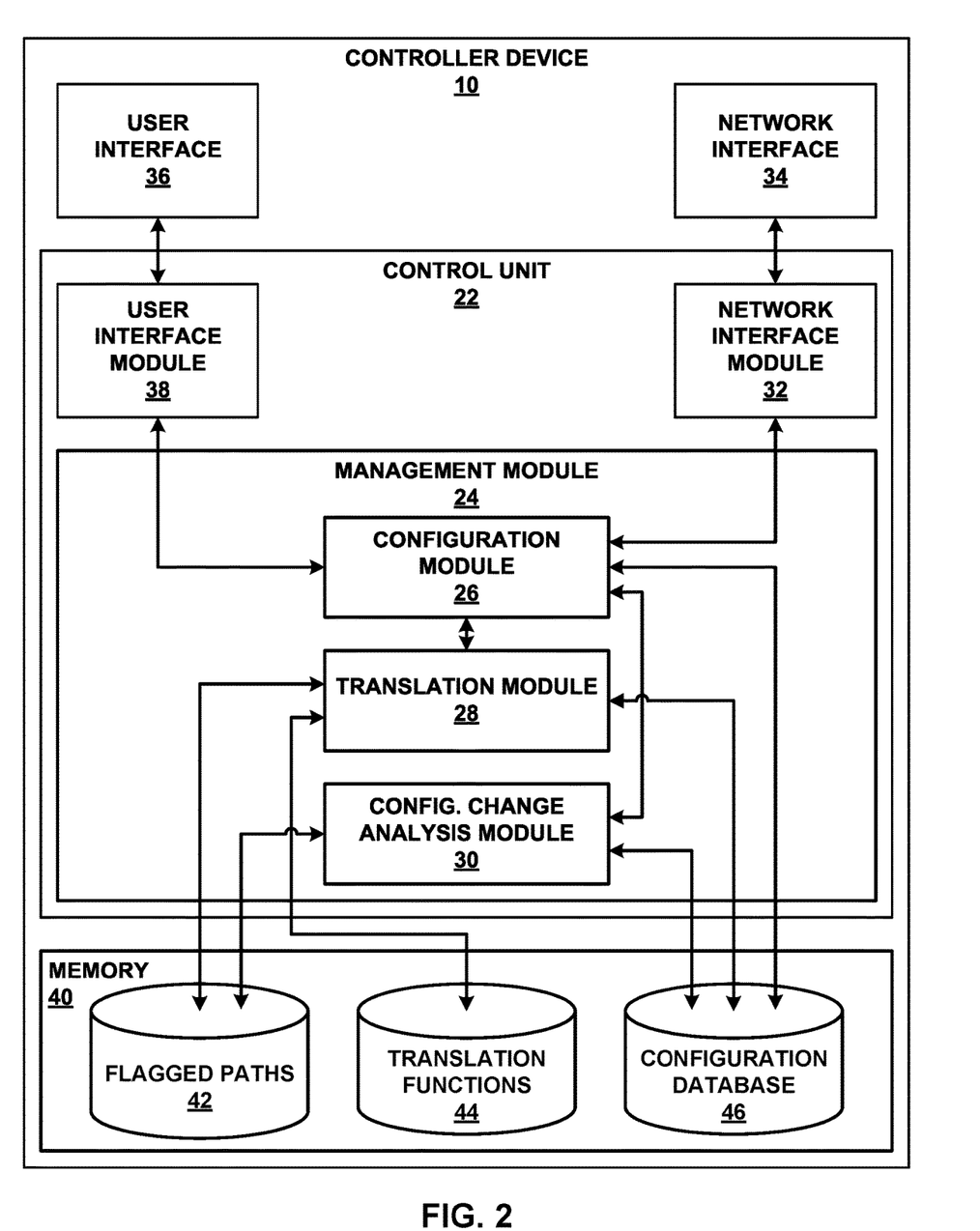
FIG. 2 is a block diagram illustrating an example set of components for the controller device of FIG. 1, in accordance with one or more techniques of this disclosure.

FIG. 2 is a block diagram illustrating an example set of components for controller device 10 of FIG. 1, in accordance with one or more techniques of this disclosure. In this example, controller device 10 includes control unit 22, network interface 34, user interface 36, and memory 40. Control unit 22 includes management module 24, network interface module 32, and user interface module 38. Management module 24 includes configuration module 26, translation module 28, and configuration change analysis module 30. Memory 40 includes flagged paths 42, translation functions 44, and configuration database 46.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

Network interface 34 represents an example interface that can communicatively couple controller device 10 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11a/b/g/n or other such wireless protocols). Controller device 10 may include multiple network interfaces in various examples, although only one network interface is illustrated for purposes of example.

User interface 36 represents one or more interfaces by which a user, such as administrator 12 (FIG. 1) interacts with controller device 10, e.g., to provide input and receive output. For example, user interface 36 may represent one or more of a monitor, keyboard, mouse, touchscreen, touchpad, trackpad, speakers, camera, microphone, or the like. Furthermore, although in this example controller device 10 includes a user interface, it should be understood that administrator 12 need not directly interact with controller device 10, but instead may access controller device 10 remotely, e.g., via network interface 34.

Memory 40 may be configured to store information within controller device 10 during operation. Memory 40 may include a computer-readable storage medium or computer-readable storage device. In some examples, memory 40 includes one or more of a short-term memory or a long-term memory. Memory 40 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory 40 is used to store program instructions for execution by controller device 10. Memory 40 may be used by software or applications running on controller device 10 to temporarily store information during program execution.

In this example, control unit 22 includes management module 24, network interface module 32, and user interface module 38. Control unit 22 executes user interface module 38 to receive input from and/or provide output to user interface 36. Control unit 22 also executes network interface module 32 to send and receive data (e.g., packets) via network interface 34. Management module 24, network interface module 32, and user interface module 38 may again be implemented as respective hardware units, or in software or firmware, or a combination thereof.

Control unit 22 executes management module 24 to manage various network devices, e.g., elements 14 of FIG. 1. Management includes, for example, configuring the network devices according to instructions received from a user (e.g., administrator 12 of FIG. 1) and providing the user with the ability to submit instructions to configure the network devices. In this example, management module 24 further includes configuration module 26 and translation module 28.

Management module 24 is configured to receive intent files (e.g., high-level configuration instructions) for a set of managed network devices from a user, such as administrator 12. Over time, the user may update the configuration instructions, e.g., to add new services, remove existing services, or modify existing services performed by the managed devices. The intents may be structured according to, e.g., YANG. In some examples, management module 24 also provides the user with the ability to submit translation functions 44 that translation module 28 executes to transform intents to device-specific, low-level configuration instructions, as discussed below.

Memory 40 includes configuration database 46. Configuration database 46 generally includes information describing managed network devices, e.g., elements 14. For example, configuration database 46 may include information indicating device identifiers (such as media access control (MAC) and/or internet protocol (IP) addresses), device type, device vendor, devices species (e.g., router, switch, bridge, hub, etc.), or the like. Configuration database 46 also stores device-level configuration information based on intents (e.g., high-level configuration information, or in some cases, both high-level configuration and low-level configuration information) for the managed devices (e.g., elements 14). Configuration database 46 may store configuration information corresponding to each element of elements 14 such that management module 24 may access configuration for any one or more of elements 14. For example, management module 24 may access configuration information corresponding to a configuration that controller device 10 pushed to element 14C.

Translation module 28 determines which devices are managed using configuration database 46. Translation module 28 determines which of translation functions 44 to execute on the high-level configuration instructions based on the information of configuration database 46, e.g., which of the devices are to receive the low-level configuration instructions. Translation module 28 then executes each of the determined translation functions of translation functions 44, providing the high-level configuration instructions to the translation functions as input and receiving low-level configuration instructions. Translation module 28 may then provide the low-level configuration instructions to configuration module 26. In some examples, translation module 28 may receive one intent corresponding to a high-level configuration and translate the high-level configuration to a set of low-level configurations, each low-level configuration corresponding to a respective element of elements 14. In some examples, translation module 28 may receive an intent corresponding to one of elements 14, and translate the intent to a low-level configuration corresponding to the respective element.

After receiving the low-level configuration instructions from translation module 28, configuration module 26 sends the low-level configuration instructions to respective managed network devices (e.g., elements 14) for which configuration is to be updated via network interface module 32. Network interface module 32 passes the low-level configuration instructions to network interface 34. Network interface 34 forwards the low-level configuration instructions to the respective network devices.

When management module 24 sends low-level configuration instructions to elements 14, these low-level configuration instructions may cause the respective elements to make configuration changes. These configuration changes are not out-of-band configuration changes, because the configuration changes are implemented in response to the elements 14 receiving low-level configuration instructions from controller device 10. When one of elements 14 implements a configuration change based on instructions received from a source other than controller device 10, the configuration change may represent an out-of-band configuration change. Out-of-band configuration changes may, in some cases, be incompatible with the high-level intent received by controller device 10. For example, controller device 10 pushes low-level configuration instructions to elements 10 in order to implement the high-level intent received by controller device 10. Out-of-band configuration changes that depart from the low-level configuration instructions may interfere with the low-level configuration instructions and render the high-level intent invalid. It may be beneficial for controller 10 to detect out-of-band configuration changes and determine whether these out-of-band configuration changes invalidate the high-level intent.

Although user interface 36 is described for purposes of example as allowing administrator 12 (FIG. 1) to interact with controller device 10, it should be understood that other interfaces may be used in other examples. For example, controller device 10 may include a representational state transfer (REST) client (not shown) that may act as an interface to another device, by which administrator 12 may configure controller device 10. Likewise, administrator 12 may configure elements 14 by interacting with controller device 10 through the REST client.

Controller device 10 further stores data representing resources provided by elements 14 (FIG. 1) in configuration database 46. The resources may include, for example, network services, hardware and/or software units, and tables of elements 14. Thus, the resources may include, for example, network tunnels (such as label switched paths (LSPs)), virtual private networks (VPNs), virtual routing and forwarding (VRF) tables, hardware interfaces, logical interfaces, or the like. Controller device 10 may be configured with a playbook, which administrator 12 (FIG. 1) can use to program the various resources. The playbook may contain a set of resource definitions, resource discovery rules, and a resource merge strategy.

In some examples, management module 24 is configured to receive a high-level intent file corresponding to an intended configuration for one or more elements of elements 14. The high-level intent file may indicate a high-level intended configuration. As used herein, the terms "high-level configuration" and "intended configuration" refer to a configuration which can be programmed and/or altered by a user. A "low-level configuration" may refer to a configuration that a network device such as one of elements 14 is configured to process and implement. Translation module may translate, using the translation functions 44, the high-level configuration to one or more low-level configurations, wherein each low-level configuration of the one or more low-level configurations corresponds to an element of elements 14. Translation module 28 may send the one or more low-level configurations to configuration module 26.

Translation module 28 may generate, based on the high-level intent file, one or more flagged XPath operations for each low-level configuration of the one or more low-level configurations generated by translation module 28. The below YANG extension may represent one or more XPaths flagged from a low-level configuration.

```
module example-extensions {
    yang-version 1.1;
    prefix "csp";
    ...
    extension watch {
        description
            "Takes as an argument a comma separate list of .
            XPATHs to watch for out of band configuration
            change from low level device model";
        argument "xpaths";
    }
}
```

This csp:watch extension will be used in the high level intent to represent a flagged XPATH/XPATHs from low level configuration Translation module 28 may store the one or more flagged XPath operations for each low-level configuration of the one or more low-level configurations in the flagged paths database 42 in memory 40. Management module 24 may evaluate the flagged paths stored in the flagged paths database 42 to determine whether an out-of-band configuration change invalidates the high-level intent received by controller device 10. XPath is a programming language which is configured to select nodes from an XML document. Consequently, the one or more identified XPath operations may indicate one or more nodes of element 14A involved in the out-of-band configuration change. Controller 10 may determine whether the out-of-band configuration change to these one or more nodes invalidates the high-level configuration.

In some examples, translation module 28 may extract information from the high-level intent to generate one or more flagged XPath operations for each low-level configuration generated by translation module 28. For example, the high-level intent may include syntax representing a user selection of one or more flagged nodes for an element (e.g., element 14A). Translation module 28 may generate, based on this syntax, one or more flagged XPaths which indicate the one or more flagged nodes. Example syntax from a YANG high-level intent is reproduced below.

```
container configuration {
    list site_vlans {
        description "LAN side VLANs at a customer site";
        key vlan_id;
        csp:watch "/configuration/vlans/vlan[vlan-id=current( )/vlan_id],
            /configuration/interfaces/interface[name=irb]/unit/[name=current( )/vlan_id]/fa
        mily/address/name"
        leaf vlan_id {
            type uint16 {
                range "1..4000";
```

```
{
  mandatory true;
  description "VLAN id that uniquely identifies a LAN side VLAN.";
}
leaf irb_ip_prefix {
  type inet:ip-prefix;
  mandatory true;
  description "IP prefix for the IRB interface assigned to this VLAN";
}
leaf-list lan_ports {
  description "LAN side interface that belongs to this VLAN";
}
}
```

As seen in the above, the example high-level intent includes a "csp:watch" YANG extension which defines two paths. These paths include "/configuration/vlans/vlan[vlan-id=current( )vlan_id]" and "/configuration/interfaces/interface[name=irb]/unit/[name=current( )vlan_id]/family/address/name." The paths identified in the high-level intent may represent a user input of paths to watch for in out-of-band configuration changes. That is, when an out-of-band configuration change involves a path identified in the csp: watch extension, then the out-of-band configuration change may invalidate the high-level intent. The syntax "current( )" may represent an XPath function that selects a context of the node in a high level intent model where the csp:watch extension is defined. For example, the syntax "current( )" may select each individual element that is present in the list "site_vlans." Accordingly, the syntax "current( )" and "vlan_id" may evaluate the value of the node "vlan_id" within each individual element of the list "site_vlans." Each XPath defined within "csp:watch" may expand to multiple XPaths depending on the XPath function used and the context in which "csp:watch" extension is defined. For example, the context may include a YANG list of containers. XPath functions may include any of the standard XPath functions (e.g., "concat( )" and "contains( )"). Translation module 28 may generate flagged XPaths corresponding to the paths in the high-level intent. Translation module 28 may store the flagged XPaths in the flagged paths database 42 in the memory 40. The example syntax from the YANG high-level intent may, in some cases, include syntax that is not shown above. For example, the YANG high-level intent may include one or more payloads, wherein each payload of the one or more payloads corresponds to one or more nodes of a configuration of a network device (e.g., one of elements 14).

In some examples, the high-level intent may flag paths on a granular basis. In one example, a csp:watch extension of a high-level intent may instruct the controller device 10 to watch for any change under the path "/configuration/interfaces/interface[name=irb]/unit/[name={{evaluated-value}}]" in the low-level configuration. That is, translation module 28 may generate a flagged XPath which will cause controller device 10 to watch for configuration changes to any node falling within the path identified in the high-level intent. In another example, a csp:watch extension of a high-level intent may instruct the controller device 10 to watch for changes to the path "/configuration/interfaces/interface[name=irb]/unit/[name={{evaluated-value}}]/family/address/name" in the low-level configuration. The syntax "{{evaluated-value}}" may represent a value that the XPath "current( )vlan_id" evaluates in the context of high-level intent model where csp:watch is defined. In some examples, the function "contains( )" is used, and the evaluated value may be preceded and followed with an asterisk (*), e.g., "{{*evaluated-value*}}," to indicate a wild-card match.

Configuration module 26 may output the one or more low-level configurations to the respective one or more elements via network interface 34 and network interface module 32. For example, translation module 28 may generate a set of low-level configurations, wherein each low-level configuration of the set-of low-level configurations corresponds to a respective one of element 14A, element 14B, element 14C, element 14D, element 14E, element 14F, and element 14G. Configuration module 26 may output each low-level configuration of the of low-level configurations to the respective one of element 14A, element 14B, element 14C, element 14D, element 14E, element 14F, and element 14G. Additionally, in some examples, Configuration module 26 may save the set of low-level configurations to configuration database 46. Configuration module 26 may, in some examples, save the high-level intent to configuration database 46. In some examples, the low-level configurations of elements 14 saved to the configuration database 46 may represent XML files. An example XML low-level configuration for a network device is reproduced below.

```
1    <configuration>
2     <vlans>
3      <vlan>
4       <name>Eng</name>
5       <vlan-id>100</vlan-id>
6       <l3-interface>irb.100</l3-interface>
7      </vlan>
8      <vlan>
9       <name>HR</name>
10      <vlan-id>101</vlan-id>
11      <l3-interface>irb.101</l3-interface>
12     </vlan>
13    </vlans>
14    <interfaces>
15     <interface>
16      <name>ge-0/0/10</name>
17      <unit>
18       <name>0</name>
19       <family>
20        <ethernet-switching>
21         <vlan>
22          <members>100</members>
23         </vlan>
24        </ethernet-switching>
25       </family>
26      </unit>
27     </interface>
28     <interface>
29      <name>ge-0/0/11</name>
30      <unit>
31       <name>0</name>
32       <family>
33        <ethernet-switching>
34         <vlan>
35          <members>101</members>
```

```
36            </vlan>
37          </ethernet-switching>
38        </family>
39      </unit>
40    </interface>
41    <interface>
42      <name>irb</name>
43      <unit>
44        <name>101</name>
45        <family>
46          <inet>
47            <address>
48              <name>192.168.101.254/24</name>
49            </address>
50          </inet>
51        </family>
52      </unit>
53    </interface>
```

The example XML low-level configuration defines a hierarchy of nodes. For example, the "interface" node in the example XML low-level configuration depends from the "interfaces" node, because the interface node is indented from the interfaces node in the example XML low-level configuration. One or more paths exist in the XML low-level configuration. For example, the path "/configuration/interfaces/interface[name=irb]/unit/[name=current( )/vlan_id]/family/address/name" corresponds to the following path in the example XML low-level configuration.

```
 1  <configuration>
14    <interfaces>
41      <interface>
42        <name>irb</name>
43        <unit>
44          <name>101</name>
45          <family>
47            <address>
48              <name>192.168.101.254/24</name>
```

When the high-level intent instructs the controller device 10 to monitor the path "/configuration/interfaces/interface[name=irb]/unit/[name=current( )/vlan_id]/family/address/name" in the configuration of element 14A, the controller device 10 may generate an XPath operation in order to monitor the corresponding path in the XML file corresponding to the configuration of element 14A.

To generate one or more XPaths, the translation module 28 may process the high-level intent to identify one or more paths identified in the "csp:watch" extension. For example, translation module 28 may identify the "/configuration/vlans/vlan[vlan-id=current( )/vlan_id]" and "/configuration/interfaces/interface[name=irb]/unit/[name=current( )/vlan_id]/family/address/name" paths identified in the csp: watch extension of the example YANG high-level intent. Translation module 28 may process the high-level intent and identify one or more payloads corresponding to the paths identified in the csp:watch extension. For example, the following example payload may correspond to the "/configuration/vlans/vlan[vlan-id=current( )vlan_id]" path.

```
{
  "site_vlans" : [
    {
      "vlan_id" : 100,
      "irb_ip_prefix" : "192.168.100.254/24",
      "lan_ports" : ["ge-0/0/10", "ge-0/0/11"]
    }
  ]
}
```

Translation module 28 may generate an XPath based on the identified path from the csp:watch extension and based on information in the identified payload from the high-level intent. For example, the identified path from the csp:watch extension includes the square bracket [vlan-id=current( )vlan_id], and the identified payload includes the value "vlan_id": 100. Translation module 28 may generate the XPath "/configuration/vlans/vlan[vlan-id=100]" based on the identified path and the vlan id value from the payload. The XPaths within square brackets may be evaluated within the context of the node in high level intent model where the csp:watch extension is defined. Transaction module 28 may evaluate XPaths within square bracket, and generate the XPaths to watch for in the low-level configuration. In other words, translation module 28 may process a payload to extract information within square brackets of a path identified in the csp:watch extension. The current( )vlan_id request in the identified path corresponds to the value "100" for vlan_id in the payload. This may allow a developer to enter a path into the high-level intent even when the developer does not know an exact ID number of a node that the developer wishes to include in the path. Consequently, by automatically generating XPaths based the payloads of the high-level intent and the paths identified in the csp:watch extension, translation module 28 may monitor a validity of the high-level intent more effectively than controller devices that do not extract data from payloads to generate XPaths based on user selected paths.

The translation module 28 is not limited to translating the high-level intent to low-level configuration instructions. In some examples, the translation module 28 may translate the high-level intent directly to command line interfaces (CLIs) for elements 14. The translation module 28 may execute one or more translation templates (e.g., Jinja templates) to generate CLIs directly from the high-level intent. The translation module 28 may generate one or more flagged XPaths when the translation module 28 generates the CLIs from the high-level intent. In some examples, a translation template may represent a user-created Jinja file. The following example represents a translation template that translation module 28 is configured to execute in order to generate CLIs based on the high-level intent.

```
1 {% - for vlan in site_vlans %}
2 set interfaces irb unit {{vlan.vlan_id}} family inet address {{vtan.irb_ip_prefix}}
3 set vlans LAN - {{vlan.vlan_id}} vlan-id {{vlan.vtan_id}} 13-interface
  irb.{{vlan.vlan_id}}
4
5 {% - for lan_port in vlan.lan_ports %}
6 set interfaces {{tan_port}} unit 0 family ethernet-switching interface-mode
7 trunk vlan members LAN - {{vlan.vlan_id}}
```

```
8  {% - endfor %}
9  {% - endfor %}
```

In some examples, translation module 28 processes the high-level intent to identify one or more paths in a csp:watch extension of the high-level intent, but this is not required. In some examples translation module 28 receives a Jinja file defining one or more paths, and translation module 28 may generate one or more flagged XPaths based on the paths defined by the Jinja file. An example Jinja file defining one or more paths is reproduced below.

```
1  {%- for vlan in site_vlans %}
2  /configuration/vlans/vlan[vlan-id={{vlan.vlan_id}}]
3  /configuration/interfaces/interface[name=irb]/unit/[name={{vlan.vlan_id}}]
4  /configuration/interfaces/interface[name=irb]/unit/[name={{vlan.vlan_id}}]/family/address
/name
5
6    {%- for lan_port in vlan.lan_ports %}
7  /configuration/interfaces/interface[name={{lan_port}}]
8
  /configuration/interfaces/interface[name={{lan_port}}]/unit[name=0]/family/ethernet
-switching/vlan/members
9    {%- endfor %}
10   {%- endfor %}
```

As seen in the example Jinja file, the file identifies the paths "/configuration/vlans/vlan[vlan-id={{vlan.vlan_id}}]," "/configuration/interfaces/interface[name=irb]/unit/[name={{vlan.vlan_id}}]," "/configuration/interfaces/interface[name=irb]/unit/[name={{vlan.vlan_id}}]/family/address/name," "/configuration/interfaces/interface[name={{lan_port}}]," and "/configuration/interfaces/interface[name={{lan_port}}]/unit[name=0]/family/ethernet-switching/vlan/members." The paths include several square brackets such as "[vlan-id={{vlan.vlan_id}}]," "[name={{vlan.vlan_id}}]," and "[name={{lan_port}}]." To generate XPaths based on the paths identified in the Jinja file, the translation module 28 is configured to identify one or more payloads in the high-level intent which include information requested in the square brackets of the paths identified in the Jinja file. For example, the translation module 28 may process the high-level intent to identify the following example payload.

```
{
    "site_vlans" : [
        {
            "vlan_id" : 100,
            "irb_ip_prefix" : "192.168.100.254/24",
            "lan_ports" : ["ge-0/0/10", "ge-0/0/11"]
        }
    ]
}
```

Translation module 28 may generate, based on the one or more paths identified in the example Jinja file and based on the example payload from the high-level intent, one or more flagged XPaths. For example, translation module 28 may generate the XPath "/configuration/interfaces/interface[name=irb]/unit/[name=100]/family/address/name" corresponding to the path "/configuration/interfaces/interface[name=irb]/unit/[name={{vlan.vlan_id}}]/family/address/name" identified in the example Jinja file. Translation module 28 may replace the square bracket [name={{vlan.vlan_id}}] from the path identified in the example Jinja file with the square bracket [name=100] to generate the XPath, since the example payload includes the value "vlan_id":100. Additionally, or alternatively, Translation module 28 may generate the XPaths "/configuration/interfaces/interface[name=ge-0/0/10]/unit[name=0]/family/ethernet-switching/vlan/members" and "/configuration/interfaces/interface[name=ge-0/0/11]/unit[name=0]/family/ethernet-switching/vlan/members" based on the path "/configuration/interfaces/interface[name={{lan_port}}]/unit[name=0]/family/ethernet-switching/vlan/members" identified by the example Jinja file. Since the example payload references two LAN ports (e.g., "lan_ports":["ge-0/0/10", "ge-0/0/11"]), Translation module 28 may generate a flagged XPath corresponding to the LAN port "ge-0/0/10" and generate a flagged XPath corresponding to the LAN port "ge-0/0/11". Translation module 28 may save the flagged XPaths to the flagged paths database 42 in the memory 42.

When configuration module 26 outputs a low-level configuration to one of elements 14, configuration 26 may output the low-level configuration with a message including an identification tag. The identification tag may indicate that the low-level configuration is pushed from the controller device 10. When the respective element of elements 14 receives the low-level configuration and the message, the element may output a return message to controller device 10, where the return message includes the identification tag. The return message may indicate that the low-level configuration is implemented at the respective element of elements 14, and the identification tag in the return message may confirm that the implemented configuration is pushed from the controller device 10. In other words, the presence of the identification tag in the return message indicates that the low-level configuration implemented at the respective element of elements 14 does not represent an out-of-band configuration change, because the controller device 10 pushed the low-level configuration to the element.

In some cases, configuration module 26 may receive, via network interface 34 and network interface module 32, a message from one of elements 14 (e.g., element 14A). The message may indicate a configuration change implemented at element 14A, and the message may omit the identification tag that marks configuration changes pushed from the controller device 10. When management module 24 receives the message from element 14A omitting the identification tag, management module 24 may determine that the message indicates an out-of-band configuration change at element 14A. That is, element 14A might have implemented the configuration change based on a user input to element 14A rather than implementing the configuration change based on receiving a low-level configuration from controller device 10. Out-of-band configuration changes may, in some cases, invalidate a high-level intent received by controller device 10. Consequently, it may be beneficial for controller device 10 to identify out-of-band configuration changes occurring at elements 14 and determine whether these out-of-band configuration changes invalidate the high-level configuration received by controller device 10.

When controller device 10 receives a message from element 14A indicating an out-of-band configuration change at element 14A, management module 24 may determine, based on a configuration of element 14A stored in configuration database 46 and based on an actual configuration of the element 14A whether the out-of-band configuration change invalidates the high-level intent received by controller device 10. In some examples, to determine whether the out-of-band configuration change invalidates the high-level model, the management module 24 is configured to retrieve, from the configuration database 46, information indicative of a stored network device configuration corresponding to element 14A. In some examples, the information indicative of the stored network device configuration corresponding to element 14A includes an XML, file representing a low-level configuration of element 14A generated by translation module 28 based on a high-level intent file. In some examples, the information indicative of the stored network device configuration corresponding to element 14A represents one or more CLIs generated by translation module 28 based on a high-level intent file. Additionally, the management module 24 is configured to retrieve, from the element 14A, information indicative of an actual configuration of the element 14A. In some examples, the information indicative of an actual configuration of the element 14A represents an XML file.

Configuration change analysis module 30 may determine a difference between the actual configuration of element 14A and the stored network device configuration corresponding to element 14A. The stored network device configuration corresponding to element 14A may represent a low-level configuration that controller device 10 pushes to element 14A prior to an out-of-band configuration change at element 14A. The actual configuration of element 14A may represent the configuration of element 14A after element 14A implements the out-of-band configuration change. Consequently, by determining the difference between the actual configuration of element 14A and the stored network device configuration corresponding to element 14A, the configuration change analysis module 30 may determine information corresponding to the out-of-band configuration change. In some examples, the information corresponding to the out-of-band configuration change may include one or more XPaths corresponding to the out-of-band configuration change. The one or more XPaths corresponding to the out-of-band configuration change may identify one or more nodes in the XML file corresponding to the configuration of element 14A, wherein the nodes identified by the XPaths represent nodes that were updated in the out-of-band configuration change.

Configuration change analysis module 30 may compare the one or more XPaths corresponding to the out-of-band configuration change with one or more flagged XPaths stored in the flagged paths database 42 corresponding to element 14A. As described above, when translation module 28 translates the high-level intent, translation module 28 may generate one or more XPaths to check in the event that element 14A implements an out-of-band configuration change. If at least one of the one or more XPaths corresponding to the out-of-band configuration change matches a flagged XPath corresponding to element 14A, configuration change analysis module 30 may determine that the out-of-band configuration change invalidates the high-level intent. If none of the one or more XPaths corresponding to the out-of-band configuration change matches a flagged XPath corresponding to element 14A, configuration change analysis module 30 may determine that the out-of-band configuration change does not invalidate the high-level intent.

By generating one or more flagged XPaths for one or more managed elements 14, controller device 10 may more effectively manage elements 14 as compared with controller devices that do not generate flagged XPaths. For example, the flagged XPaths allow controller device to evaluate a detected out-of-band configuration change to determine whether the out-of-band configuration change invalidates the high-level intent.

Figure 3:
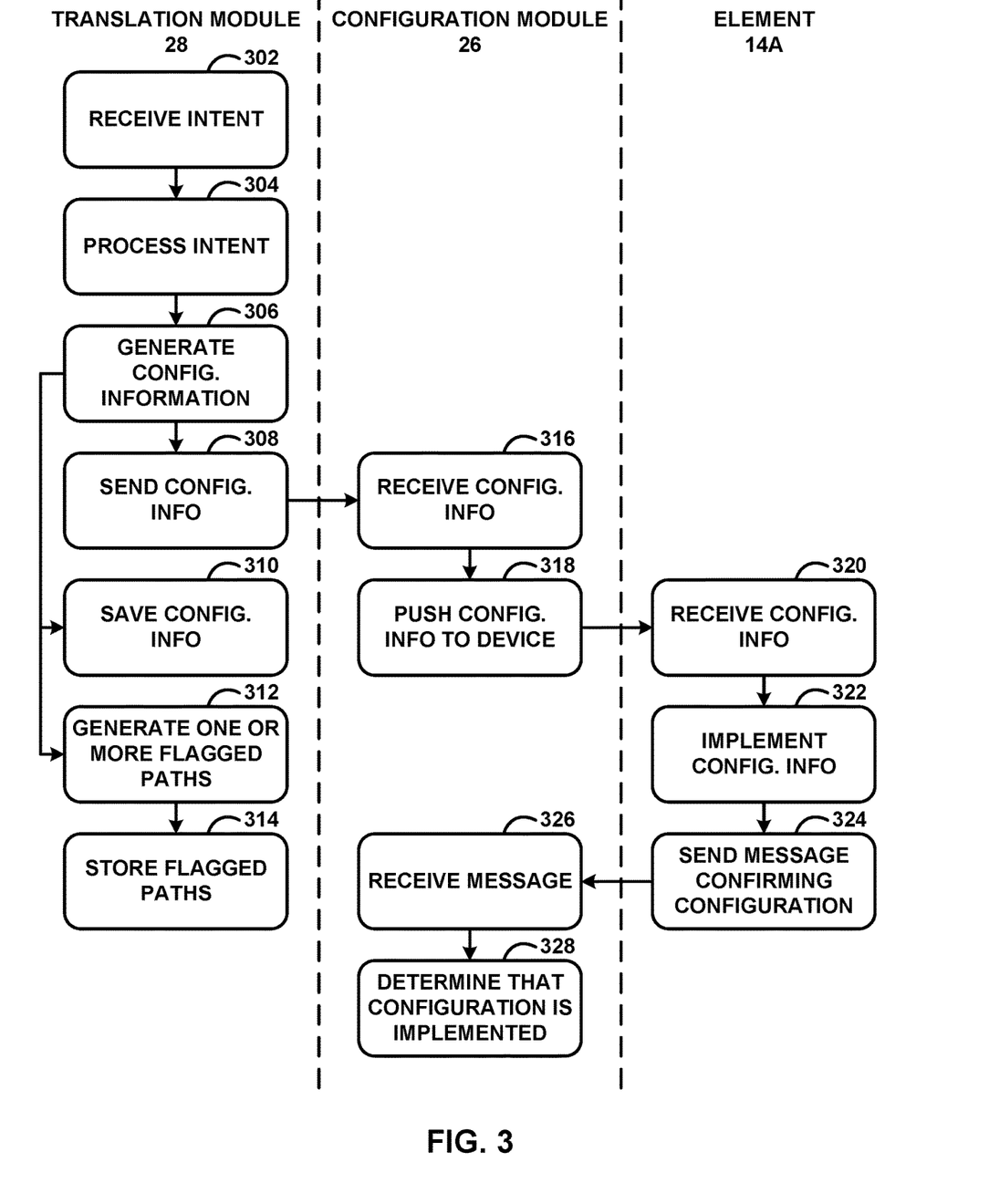
FIG. 3 is a flow diagram illustrating an example operation for processing an intent to cause a device to implement a configuration, in accordance with one or more techniques of this disclosure.

FIG. 3 is a flow diagram illustrating an example operation for processing an intent to cause a device to implement a configuration, in accordance with one or more techniques of this disclosure. For convenience, FIG. 3 is described with respect to controller device 10 and elements 14 of FIGS. 1-2. However, the techniques of FIG. 3 may be performed by different components of controller device 10 and elements 14 or by additional or alternative devices.

Translation module 28 may receive an intent (302). In some examples, translation module 28 may receive the intent via user interface 36 and user interface module 38. The intent may represent a text file such as a YANG file. In some examples, configuration module 26 receives the intent and forwards the intent to translation module 28 with an instruction to process the intent. Translation module 28 may process the intent (304). In some examples, the intent represents a high-level intent. Translation module 28 may generate configuration information (306) for element 14A. In some examples, translation module 28 may generate configuration information for any one or combination of elements 14 based on the intent. When the intent represents a high-level intent, translation module 28 may generate the configuration information by translating, based on translation functions 44, the high-level intent to a low-level configuration corresponding to element 14A. In some examples, translation module 28 may process the intent to generate one or more CLIs for configuring element 14A without translating a high-level intent to low-level configurations.

Translation module 28 may save the configuration information (310) to configuration database 46. In some examples, translation module 28 may save configuration information corresponding to each of elements 14 that controller device 10 manages. That is, configuration database 46 may include the configuration information pushed to the elements 14 managed by controller device 10 so that controller device 10 may access the configuration information when analyzing out-of-band configurations.

Additionally, translation module 28 may generate one or more flagged paths (312) based on generating the configuration information for entity 14A. In some examples, the intent may include text indicating one or more paths representing user input of one or more paths for controller device 10 to check in response to detecting an out-of-band configuration. When the intent includes text indicating one or more paths, translation module 28 may generate one or more flagged XPaths based on the text and based on one or more payloads in the intent. In some examples, translation module 28 may receive a path template which indicates one or more paths representing user input of one or more paths for controller device 10 to check in response to detecting an out-of-band configuration. Translation module 28 may process the intent and the path template to generate the one or more flagged paths. Translation module 28 may store the flagged paths (314) to the flagged paths database 42. That is, translation module 28 may store the flagged paths so that controller device 10 may access the flagged paths when analyzing out-of-band configurations.

Configuration module 26 may receive the configuration info (316) from translation module 28. Configuration module 26 may push the configuration info to element 14A (318). In some examples, configuration module 26 may push the configuration information to element 14A with a message including an identification tag that indicates the configuration information is pushed from controller device 10. Element 14A may receive the configuration info (320) and implement the configuration info (322). That is, element 14A may perform a configuration change based on the configuration info. Element 14A may send a message confirming the configuration change at element 14A (324). In some examples, element 14A may include the identification tag with the message. Configuration module 26 may receive the message (326). Configuration module 26 may determine that the configuration change is implemented (328) at element 14A. In some examples, configuration module 26 may determine that the configuration change is not an out-of-band configuration change because the message from element 14A to configuration module 26 includes the identification tag.

Figure 4:
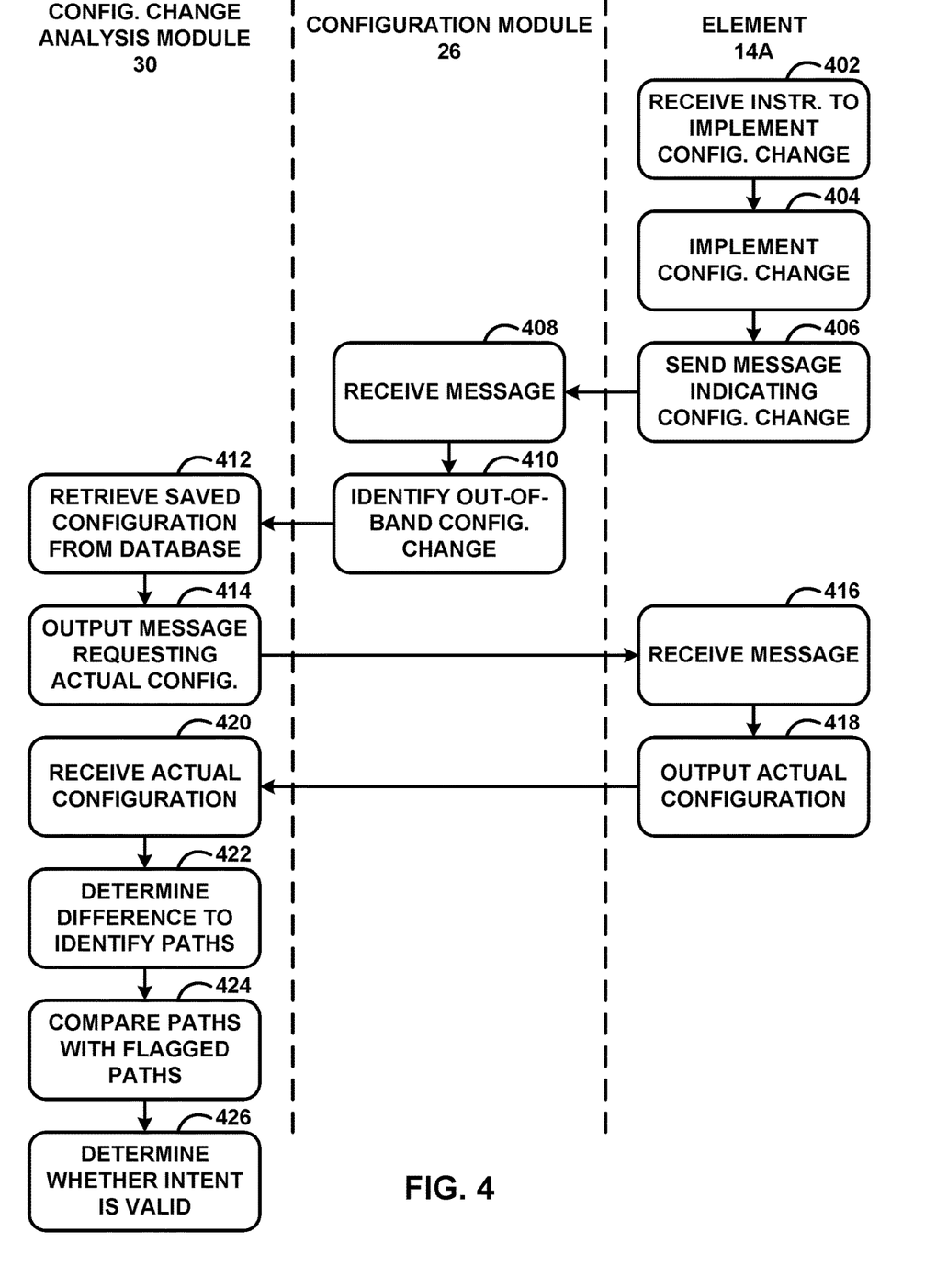
FIG. 4 is a flow diagram illustrating an example operation for determining whether an out-of-band configuration change invalidates an intent, in accordance with one or more techniques of this disclosure.

FIG. 4 is a flow diagram illustrating an example operation for determining whether an out-of-band configuration change invalidates an intent, in accordance with one or more techniques of this disclosure. For convenience, FIG. 4 is described with respect to controller device 10 and elements 14 of FIGS. 1-2. However, the techniques of FIG. 4 may be performed by different components of controller device 10 and elements 14 or by additional or alternative devices.

Element 14A may receive an instruction to implement a configuration change (402). Element 14A may implement the configuration change (404) based on receiving the instructions. In some examples, the configuration change represents an out-of-band configuration change because the configuration change is based on instructions element 14A receives from a device other than controller device 10 or receives via a user input to element 14A. That is, the configuration change is not based on an intent received by controller device 10. Element 14A may send a message indicating the configuration change (406). In some examples, element 14 a may omit an identification tag from the message, where the identification tag indicates configuration changes that element 14A implements based on instructions from controller device 10. Since the configuration change is an out-of-band configuration change, element 14A may omit the identification tag from the message.

Configuration module 26 may receive the message (408). Configuration module 26 may identify the configuration change as an out-of-band configuration change (410) based on the message omitting the identification tag. Based on configuration module 26 identifying an out-of-band configuration change at element 14A, configuration change analysis module 30 may retrieve a saved configuration from configuration database 46. The saved configuration may represent configuration information implemented by entity 14A prior to the out-of-band configuration change. Additionally, configuration change analysis module 30 may output a message requesting an actual configuration (414) of element 14A. element 14A may receive the message (416) and output the actual configuration (418) of element 14A. In some examples, both of the stored configuration and the actual configuration of element 14A represent XML files. Configuration change analysis module 30 may receive the actual configuration (420). Configuration change analysis module 30 may determine a difference between the stored configuration and the actual configuration in order to identify one or more paths associated with the out-of-band configuration change (422). When the stored configuration and the actual configuration of element 14A represent XML files, configuration change analysis module 30 may generate one or more XPaths associated with the out-of-band configuration change, where each XPath of the one or more XPaths identifies one or more nodes of the configuration of element 14A involved in the configuration change.

Configuration change analysis module 30 may compare the one or more paths associated with the out-of-band configuration change with one or more flagged paths stored in the flagged paths database 42. In some examples, the controller device 10 generates the one or more flagged paths when generating configuration information for element 14A. Configuration change analysis module 30 may determine whether the out-of-band configuration change invalidates the intent based on whether one or more of the paths associated with the out-of-band configuration change matches a flagged path corresponding to element 14A.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

What is claimed is:

1. A controller device that manages a set of network devices, the controller device comprising:
  a memory comprising data for a configuration database including a set of stored network device configurations, wherein each stored network device configuration of the set of stored network device configurations corresponds to a network device of the set of network devices; and
  processing circuitry configured to:
    receive an intent file corresponding to an intended configuration for the set of network devices;
    translate the intent file to a low-level configuration for each network device of the set of network devices;
    output the low-level configuration corresponding to each network device of the set of network devices to implement the intended configuration;
    identify, based on the intent file, one or more characteristics to monitor in out-of-band configurations according to one or more instructions other than the low-level configuration corresponding to each network device of the set of network devices output by the processing circuitry of the controller;
    receive a message from a network device of the set of network devices indicating an out-of-band configuration change at the network device; and
    determine, based on a difference between an actual configuration of the network device and a stored network device configuration corresponding to the network device and based on the one or more characteristics, whether the intent file is compatible with the out-of-band configuration change.

2. The controller device of claim 1, wherein the processing circuitry is further configured to:
  output, to the network device of the set of network devices, a message requesting the actual configuration of the network device;
  receive, from the network device, information indicative of the actual configuration of the network device;
  retrieve, from the memory, the stored network device configuration corresponding to the network device; and
  determine the difference between the actual configuration of the network device and the stored network device configuration.

3. The controller device of claim 1, wherein to identify the one or more characteristics to monitor, the processing circuitry is further configured to:
  generate, based on the intent file, one or more flagged XML Path Language (XPath) operations representing XPath operations to check for in out-of-band configuration changes, and wherein the processing circuitry is further configured to:
  store the one or more flagged XPath operations in the memory; and
  determine whether the intent file is compatible with the out-of-band configuration change based on the one or more flagged XPath operations and based on the difference between the actual configuration of the network device and the stored network device configuration.

4. The controller device of claim 3, wherein the processing circuitry is further configured to:
  receive the intent file via a user interface, wherein the intent file includes user input defining the one or more flagged XPath operations; and
  generate the one or more flagged XPath operations based on the user input.

5. The controller device of claim 4, wherein to generate the one or more flagged XPath operations based on the user input, the processing circuitry is configured to extract, from a schema of the intent file, the one or more flagged XPath operations, wherein the processing circuitry is configured to determine one or more paths identified in the schema.

6. The controller device of claim 3, wherein to determine whether the intent file is compatible with the out-of-band configuration change, the processing circuitry is configured to:
  identify, based on the difference between the actual configuration of the network device and the stored network device configuration, one or more XPath operations associated with the out-of-band configuration change; and
  determine whether any of the one or more flagged XPath operations match any of the one or more XPath operations associated with the out-of-band configuration change.

7. The controller device of claim 6, wherein the processing circuitry is configured to determine that the intent file is not compatible with the out-of-band configuration change based on at least one of the one or more flagged XPath operations matching at least one of the one or more XPath operations are associated with the out-of-band configuration change.

8. The controller device of claim 1, wherein the intent file represents a high-level intent,
  wherein to output the low level configuration corresponding to each network device of the set of network devices, the processing circuitry is configured to output a low-level configuration corresponding to the network device of the set of network devices with a first message including an identification tag indicating that the low-level configuration is pushed from the controller device, and
  wherein the processing circuitry is further configured to receive, from the network device, a second message indicating that the low-level configuration is implemented on the network device, wherein the second message includes the identification tag.

9. The controller device of claim 8, wherein the processing circuitry is further configured to:
  receive a third message from the network device, wherein the third message omits an identification tag indicating that the configuration change is pushed from the controller device; and
  determine, based on the third message omitting the identification tag indicating that the configuration change is pushed from the controller device, that the third message indicates the out-of-band configuration change at the network device.

10. The controller device of claim 1, wherein the intent file represents a Yet Another Next Generation (YANG) file.

11. A method comprising:
maintaining, by processing circuitry of a controller device and in a memory of the controller device, data for a configuration database including a set of stored network device configurations, wherein each stored network device configuration of the set of stored network device configurations corresponds to a network device of a set of network devices managed by the controller device;
receiving, by the processing circuitry, an intent file corresponding to an intended configuration for the set of network devices;
translating, by the processing circuitry, the intent file to a low-level configuration for each network device of the set of network devices;
outputting, by the processing circuitry, the low-level configuration corresponding to each network device of the set of network devices to implement the intended configuration;
identifying, by the processing circuitry based on the intent file, one or more characteristics to monitor in out-of-band configurations according to one or more instructions other than the low-level configuration corresponding to each network device of the set of network devices output by the processing circuitry of the controller;
receiving, by the processing circuitry, a message from a network device of the set of network devices indicating an out-of-band configuration change at the network device; and
determining, by the processing circuitry based on a difference between an actual configuration of the network device and a stored network device configuration corresponding to the network device and based on the one or more characteristics, whether the intent file is compatible with the out-of-band configuration change.

12. The method of claim 11, further comprising:
outputting, to the network device of the set of network devices, a message requesting the actual configuration of the network device;
receiving, from the network device, information indicative of the actual configuration of the network device;
retrieving, from the memory, the stored network device configuration corresponding to the network device; and
determining the difference between the actual configuration of the network device and the stored network device configuration.

13. The method of claim 11, wherein identifying the one or more characteristics to monitor comprises:
generating, by the processing circuitry based on the intent file, one or more flagged XML Path Language (XPath) operations representing XPath operations to check for in out-of-band configuration changes, and wherein the method further comprises:
storing, by the processing circuitry, the one or more flagged XPath operations in the memory; and
determining, by the processing circuitry, whether the intent file is compatible with the out-of-band configuration change based on the one or more flagged XPath operations and based on the difference between the actual configuration of the network device and the stored network device configuration.

14. The method of claim 13, further comprising:
receiving, by the processing circuitry, the intent file via a user interface, wherein the intent file includes user input defining the one or more flagged XPath operations; and
generating, by the processing circuitry, the one or more flagged XPath operations based on the user input.

15. The method of claim 14, wherein generating the one or more flagged XPath operations based on the user input comprises:
extracting, by the processing circuitry from a schema of the intent file, the one or more flagged XPath operations; and
determining, by the processing circuitry, one or more paths identified in the schema.

16. The method of claim 13, wherein determining whether the intent file is compatible with the out-of-band configuration change comprises:
identifying, based on the difference between the actual configuration of the network device and the stored network device configuration, one or more XPath operations associated with the out-of-band configuration change; and
determining whether any of the one or more flagged XPath operations match any of the one or more XPath operations associated with the out-of-band configuration change.

17. The method of claim 16, further comprising determining, by the processing circuitry, that the intent file is not compatible with the out-of-band configuration change based on at least one of the one or more flagged XPath operations matching at least one of the one or more XPath operations are associated with the out-of-band configuration change.

18. The method of claim 11, wherein the intent file represents a high-level intent,
wherein outputting the low level configuration corresponding to each network device of the set of network devices comprises outputting, by the processing circuitry, a low-level configuration corresponding to the network device of the set of network devices with a first message including an identification tag indicating that the low-level configuration is pushed from the controller device, and
wherein the method further comprises receiving, by the processing circuitry from the network device, a second message indicating that the low-level configuration is implemented on the network device, wherein the second message includes the identification tag.

19. The method of claim 18, further comprising:
receiving, by the processing circuitry, a third message from the network device, wherein the third message omits an identification tag indicating that the configuration change is pushed from the controller device; and
determining, by the processing circuitry based on the third message omitting the identification tag indicating that the configuration change is pushed from the controller device, that the third message indicates the out-of-band configuration change at the network device.

20. A system comprising:
a set of network devices; and
a controller device that manages the set of network devices, the controller device comprising:
a memory comprising data for a configuration database including a set of stored network device configurations, wherein each stored network device configuration of the set of stored network device configurations corresponds to a network device of the set of network devices; and
processing circuitry configured to:
receive an intent file corresponding to an intended configuration for the set of network devices;

translate the intent file to a low-level configuration for each network device of the set of network devices;

output the low-level configuration corresponding to each network device of the set of network devices to implement the intended configuration;

identify, based on the intent file, one or more characteristics to monitor in out-of-band configurations that according to one or more instructions other than the low-level configuration corresponding to each network device of the set of network devices output by the processing circuitry of the controller;

receive a message from a network device of the set of network devices indicating an out-of-band configuration change at the network device; and determine, based on a difference between an actual configuration of the network device and a stored network device configuration corresponding to the network device and based on the one or more characteristics, whether the intent file is compatible with the out-of-band configuration change.

\* \* \* \* \*